J. M MAY.
Plow.
No 4,493.
Patented May 2. 1846.
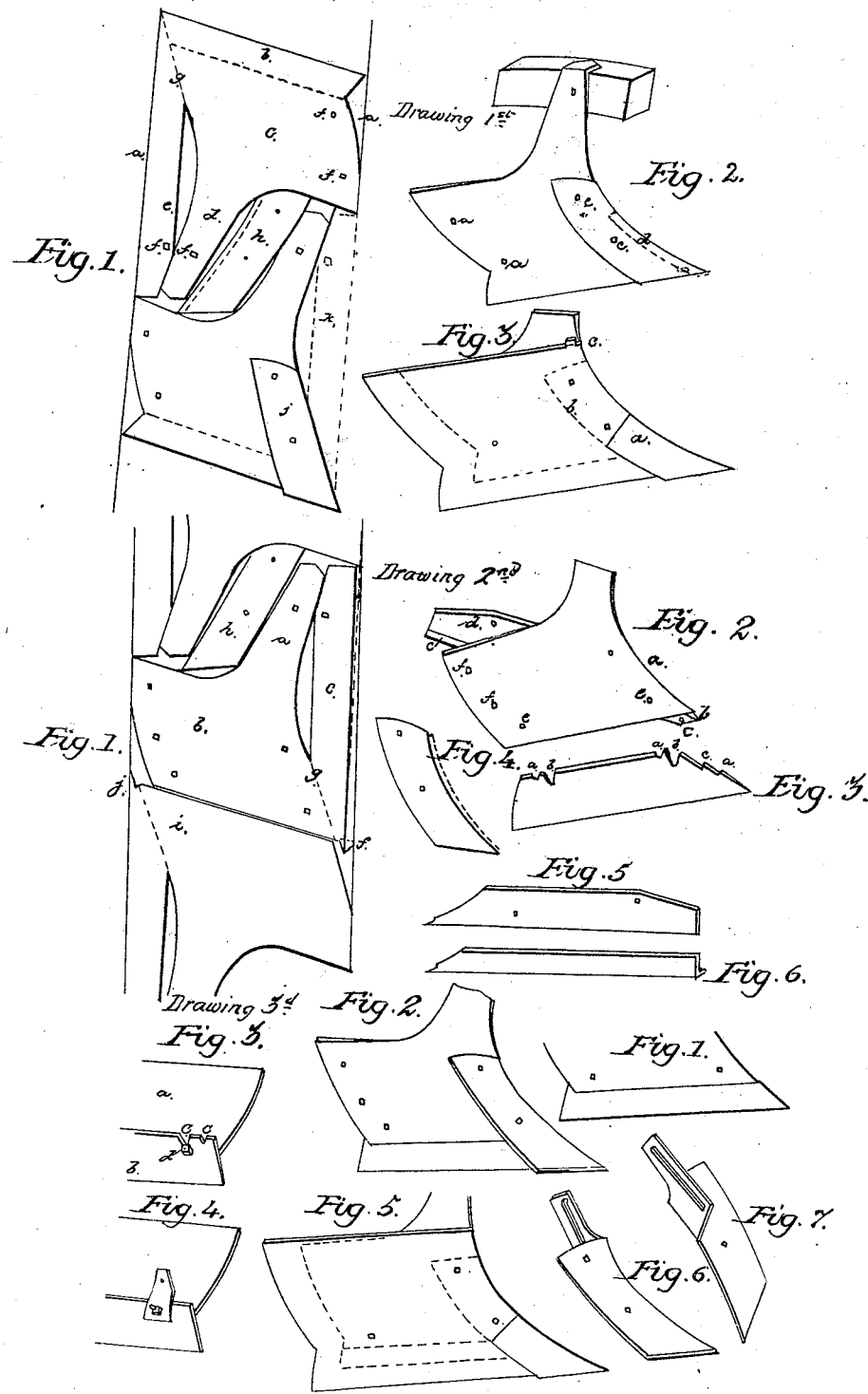

UNITED STATES PATENT OFFICE.

JNO. M. MAY, OF PHILADELPHIA, PENNSYLVANIA.

IMPROVEMENT IN PLOWS.

Specification forming part of Letters Patent No. 4,493, dated May 2, 1846.

*To all whom it may concern:*

Be it known that I, JOHN M. MAY, of Philadelphia, in the State of Pennsylvania, have invented a new and useful Improvement in Plows; and I do hereby declare that the following is a full and exact description.

The nature of my invention consists in constructing the landside, the share, the mold-board, and the plow-post all of one piece of iron, steel, or other suitable plate metal; also, in providing plows with progressive shares that, when worn, may be projected forward, giving additional wear at each progressive movement forward, instead of providing new shares to supply the place of old ones; also, in a guard placed on the front part of a finished plow, protecting the front part of the mold-board, share, and landside from wear, and which may be made with a projection having an elongated slot for attaching, by means of a sliding pivot, a double-edged colter; also, in providing plows with different sizes of mold-boards and shares, so that a small plow may readily be transformed into any required size by applying a mold-board and share of the size required; also, in a double-edged colter that can be adjusted in any desired position by means of screws projecting from the beam and elongated slots, and fastened to the projection from the guard by a sliding pivot moving in slots.

To enable others skilled in the art to make and use my invention, I will proceed to describe its construction and operation, reference being had to the annexed drawings, making a part of this specification.

Drawing I, Figure 1, gives a view of the manner of cutting plows entire from one piece of iron, steel, or other suitable material (two plows being here marked out on one piece of plate.)

$a\ a$ represent the edges or width of the plate.

$b$ represents the share of a plow.

$c$ represents the mold-board.

$d$ represents the plow-post.

$e$ represents the landside.

$f\ f\ f\ f$ represent countersunk holes for square bevel-headed bolts by which the handles and beam of the plow are fastened.

$g$ represents a dotted line where the plate is bent to form the angle of the mold-board and landside when the plow is formed. The plate, cut according to the lines, and formed in dies, swages, or otherwise, a share, mold-board, landside, and posts, ready for wooding, is made of one piece of plate metal. Before forming the plow the part constituting the share may be brought to an edge.

$h$ represents a portion of plate cut out from between two plows, from which is made the guard, to fit and cover the forward part of the mold-board and share and act as a protection to that part of the plow most liable to wear. This guard projects forward of the point of the plow and to the left sufficiently to cover the forward part of a false landside when one is used. The upper end of the guard, where it terminates on the mold-board, is made thin or brought to an edge and the rear edge beveled, and the guard so formed and fitted to the plow that the earth passes lengthwise over it, preventing any lodgment of earth at its edges or top.

$i$ represents a dotted line, showing where an angle may be formed in the guard (corresponding with the angle of the landside and mold-board) by bending the narrow part backward or forward the whole or a part of its length. If bent forward, it may be made sharp and act as a colter. This is so formed or bent mainly to add strength to the guard when it is made of thin material and liable to be sprung or bent from its place on the plow. But, instead of bending the edge of the guard as described, a bar of iron or steel may be riveted or welded to the front edge, extending from the point toward the top of the guard. The guard may also be made with a projection for attaching the colter, as represented in Drawing III, Figs. 6 and 7, and in Drawing IV, as will hereinafter be described. When the guard is worn out it may be removed and its place supplied with a new one, or the bolts screwed to their places in the countersunk holes in the mold-board, so as to present an even surface, that the plow may be perfect without a guard.

$j$ represents the portion of plate $h$ cut for the guard. It is inverted, showing its position on a plow before being formed. When the piece of plate between two plows is too small for the guard a larger plate must be used.

$k$ represents, by dotted lines, the place occupied by the landside before being bent to its place.

Fig. 2 represents a plow formed from a part of the plate, Fig. 1. It is principally formed in dies or swages. The back or rear part of the post, from the top of the mold-board upward, is bent or twisted to the left or backward, making a hollow or concave, adding great strength to the post. In this figure is represented a part of the beam with the top of the post extending over it, and the post and beam fastened by a bolt passing horizontally through them; or the post may pass through the beam and be fastened with a key, or it may be fastened in any of the usual methods.

$a\ a$ represent holes in the mold-board for fastening the right-hand handle.

$c\ c$ represent holes in the forward part of the mold-board for fastening the guard.

$d$ represents a bar of iron or steel fastened to the upper surface of the guard to strengthen it, (instead of forming the angle as described in Fig. 1, letter $i$,) at the same time forming the point. This is a small plow, which may readily be transformed into a large plow by removing the guard (if one is used) and adapting and applying a mold-board and share of the required size; or it may be used wholly as a foundation for different-sized plows.

Fig. 3 is a sectional view of the plow represented in Fig. 2 with a larger share and mold-board applied. The size of the original plow being indicated by dotted lines, the guard is removed and a mold-board and share of suitable size for a two-horse plow is made to fit the original plow, and fastened to it by bolts used for fastening the guard, and one or both of those for fastening the right-hand handle, the holes in the two mold-boards corresponding for that purpose. This mold-board and share are made of one piece of plate; but they may be made separate, requiring one or more additional bolts to fasten them to the original plow. The advantage of this is that the share, which wears fastest, may be removed for sharpening or its place supplied by a new one without removing the mold-board from its place. Thus by applying different-sized mold-boards and shares this plow may be readily transformed into one of any required size to turn different widths of furrow.

$a$ represents a plate of iron or steel fastened to the share or mold-board, or both, to form, if desired, a point.

$b$ represents a dotted line, showing that this plate may extend toward the top of the mold-board; or, instead, a guard may be used, the same as on the original plow.

$c$ represents a knob or projection fastened near the front part of the post, at the upper edge of the mold-board, for the edge of the extra or additional mold-board to rest against to aid the bolts in retaining the mold-board firmly to its position when the points strike a rock or other resistance; or a projection may extend from the mold-board to match a perforation in the front part of the post; or, if the bolts are sufficiently strong, the knob and projection may be dispensed with.

Drawing II, Fig. 1, is a view of a plate of metal with two plows marked out preparatory to cutting, similar to those in Drawing I, Fig. 1, the only essential difference being that in this figure the mold-board is planned for having attached to it the movable progressive share and addition to the landside, as hereinafter described.

$a$ represents the post.

$b$ represents the mold-board.

$c$ represents the landside, the lower edge of which is bent inward, forming an angle on the line $d$. This serves to strengthen the landside and form an additional support to the share; or the plate may be cut at the dotted line $e$ and only the part of the landside next the heel bent inward.

$f$ represents a notch in the forward part of the landside, into which a corresponding one in the share locks.

$g$ represents the angle or junction of the mold-board and landside when the plate is formed in dies or molds.

$h$ represents the part from which the guard is formed.

$i$ represents a part of the plate for another plow, the landside of which is made plain, without bending the lower edge inward.

$j$ represents the notch on which the share locks.

Fig. 2 is a view of the landside, mold-board, and section of a post, after being formed in dies, molds, or otherwise.

$a$ represents the mold-board.

$b$ represents the notch on which the share locks.

$c\ c$ represent the part of the landside bent inward.

$d$ represents the inside of the landside.

$e\ e$ represent holes for the bolts that fasten the share.

$f\ f$ represent holes for bolts that fasten the right-hand handle to the mold-board.

The lower side of the mold-board from the bolt-holes $e\ e$ is tapered or beveled, and made quite sharp at the lower edge, so as to present, when the share is placed to its position, a smooth, continuous surface of the face side of the mold-board and share.

Fig. 3 is a view of a movable progressive share belonging to the part of a plow represented in Fig. 2.

$a$ represent a notch in the front or landside end of the share, which locks or matches into the notch $b$, Fig. 2.

$b\ b$ represent deep notches in the back or rear edge of the share that rests against the bolts at $e\ e$, Fig. 2, when notch $a$ is at its place in notch $b$, Fig. 2.

$c$ represents another notch in the front or landside end of the share.

$d\ d$ represent shallow notches in the back or rear end of the share to correspond with notch $c$. The share is fastened to its place by notches $a$ and $b\ b$, and notch $b$ and bolts at $e\ e$ in Fig. 2, and when quite worn may, by loosening the bolts, be projected forward and fastened, as before, at notches $c$ and $d\ d$ by the bolts, thus giving an additional amount of wear equal to the distance pushed forward. The mold-board and share having a corresponding curve, the shape of the plow is preserved when the share is moved. Additional notches may be made and the share projected forward an additional number of times, instead of putting on a new share, with the only trouble of unscrewing and screwing up the bolts and moving the share, unless the share is made of such thick material as to require sharpening.

Fig. 4 is a view of the guard to be placed on the plow, as in Drawing I, Fig. 2, the lower bolts in the front part of the mold-board for fastening the share being one of the bolts that fasten the guard.

Fig. 5 is a view of a landside made plain, but having a notch for the share to lock into.

Fig. 6 is a view of a false landside, which may be bolted to the main landside, and having a notch for the share.

*a* represents an angle at the lower edge of the landside, extending the whole or only a part of its length. When the landside has this angle the false landside may be made plain; or, if the material is sufficiently strong so as not to be liable to bend or break, both may be made plain, or the false landside dispensed with altogether, the principal object of the angle being additional strength and of the false landside additional wear.

Drawing III, Fig. 1, is a section representing the mold-board and share put together and fastened by the bolts. The plow may be used without the guard, though in this form the guard is very valuable.

Fig. 2 is a sectional view of the mold-board, share, guard, and part of the post.

Fig. 3 is a sectional view of the mold-board and share inverted, showing the manner of fastening a share to the mold-board by means of notches and screws. In this method the nuts to the screws must be quite large, so as to cover enough of the surface of the share to hold it firm.

*a* represents a part of the mold-board.

*b* represents a part of the share.

*c c* represent two of the notches in the share.

*d* represents one of the bolts and nut for fastening the share to the mold-board, or the plan represented in Fig. 4 may be substituted for this.

Fig. 4 is a sectional view of a method of fastening the share similar to that given in Fig. 3, with the addition of straps or plates fastened to the mold-board above the share, and departing from the mold-board sufficiently to admit the thickness of the share, then extending downward equidistant from the mold-board, and provided with holes to correspond with those in the mold-board for bolts, thus forming clamps or jaws for holding or fastening the share.

Fig. 5 is a sectional view of the plow represented in Fig. 2, the rear and lower edges of the mold-board and share being indicated by dotted lines. The guard, as in Fig. 2, is removed, and a large mold-board and share are fastened to the plow by the bolts used in fastening the share and guard. This plow, except the progressive share, is transformable in the same manner as the plow described in Drawing I, Fig. 3.

Fig. 6 represents a guard with a projection from the upper part of the forward edge, forming an angle like or somewhat more acute than that of the landside and mold-board, and extending (when placed on the plow) upward and nearly parallel with the left-hand handle of the plow, and having a longitudinal mortise or slot for attaching the end of a colter, as hereinafter described in Drawing IV.

Fig. 7 represents the guard described in Fig. 6 in an inverted position.

Drawing IV is a landside elevation view of a plow with a double-edged colter, and exhibiting the manner of attaching it to the guard and adjusting it in any desired position.

*a* represents the beam of the plow.

*b* represents the upper end of the post, extending over and part way across the top of the beam.

*c* represents a part of the left-hand handle.

*d* represents the landside.

*e* represents the part of the landside formed in an angle, described in Drawing II, Fig. 1, letter *c*.

*f* represents the notch in the forward part of the landside in which the share locks.

*g* represents a part of the share locked into the notch in the landside.

*h* represents a part of the guard above the landside formed in an angle at the front edge of the mold-board, and projecting toward the beam, as previously described, with a mortise or slot for a sliding pivot for attaching the colter, so that it may be raised or lowered and retained in its place. The upper end of this mortise has a round hole sufficient to admit the head of the pivot.

*i* represents a double-edged colter. Near the center it is fastened by a pivot or rivet to the movable arm *k*. This arm and the part of the colter extending from the pivot forward each have a long mortise or slot, through which screws *l l* projecting from the beam extend. The colter is held in any desired position by means of nuts *m m* on the screws between the arm and colter and beam and thumb-screws or nuts *n n*, which are screwed firmly against the arm and colter, thus holding them between the nuts *m m* and the nuts *n n*. The colter is made sharp from the point on both edges, at least as far as the pivot fastening the arm. From near the point a mortise or slot, *o*, extends forward. At the end of the mortise next the point is a round hole sufficient to admit the head of the sliding pivot.

*j* represents the head of the sliding pivot. It has a beveled head to match a corresponding bevel in the mortise *o* in the colter, and the head of the pivot, being nearly flat, presents, with the side of the colter, an even surface. The neck of the pivot extends from the bevel through the balance of the thickness of the colter, and through the mortise in the projection of the guard to its shoulder, back side of the projection, thus connecting the colter to the projection. When the point of the colter is raised or lowered the pivot slides in the mortise in the projection, and when the colter is moved backward and forward it slides on the pivot.

By placing the colter in a position inclining upward and forward from its point, vines, weeds, grass, straw, and other obstructions on and near the surface of the ground are easily severed by the drawing-knife cut of the colter, the earth rising on the mold-board pressing them against its edge.

By the long mortises and screws the colter may be put in a position so that a portion of the edge near the point may be used, and when dulled by using the colter is moved back, presenting a portion of the sharp edge, and so continues successively until the entire length of the lower edge is used in the same manner; then run off the thumb-screws move the colter forward until the head of the pivot will pass through the hole near the point of the colter; reverse the colter so that the dull edge will be upward and the sharp one downward; reverse the arm $k$ and bring it to its place; fasten and use the colter as before. The cutting part of this colter can be raised or lowered to correspond with the depth of plowing, and the front end may be set farther from or near to the beam to adjust it to the width of furrow. The great length of this colter requires it to be made firm at the ends and middle. If made quite short, one screw and the arm may be dispensed with, or, if the guard is made without a projection and the colter quite short, the arm and the two screws alone may be used to support the colter.

When the guard is not used and extra or different-sized mold-boards are used, the mold-board may be made with a projection similar to that projecting from the guard for the purpose of securing a colter to it.

A colter may be fastened by a screw-bolt to the projection from the mold-board or guard (as one or the other is used) without the aid of other fastening, and will admit of being placed in any desired position.

The material used in making the share, the guard, the colter, the extra or various-sized mold-boards and shares may be cast or wrought iron, steel, or other suitable material.

What I claim as my invention, and desire to secure by Letters Patent, is—

1. The making the landside, the mold-board, and post of plows all of one piece of plate metal, as herein described thereby saving much expense in making, and being more firm and substantial than when made of separate pieces.

2. The adaptation of a guard superficially applied to finished plows, as herein described, thereby adding to their durability by protecting the parts most liable to wear, when removed leaving that part of the plow as perfect as when new, and may be used or omitted at pleasure.

3. The method of attaching and securing the movable progressive share by means of the bolts passing down below the mold-board, in combination with the notches in the back edge of the share, substantially as herein described, thereby saving (when this form of plow is used) the great expense of shares, as one progressive share equals in service several of the ordinary kind.

4. The method of fastening and adjusting the colter as herein described, thereby presenting successively a great length of cutting-edge to sever obstructions before the plow.

JOHN M. MAY.

Witnesses:
T. C. DONN,
J. J. GREENOUGH.